United States Patent
Tanaka et al.

[11] Patent Number: 5,525,294
[45] Date of Patent: Jun. 11, 1996

[54] ALUMINUM ALLOY FOR SLIDING MATERIALS

[75] Inventors: Tadashi Tanaka; Masaaki Sakamoto; Yoshiaki Sato; Yutaka Masuda, all of Nagoya, Japan

[73] Assignee: Daido Metal Company, Ltd., Nagoya, Japan

[21] Appl. No.: 337,840

[22] Filed: Nov. 9, 1994

[30] Foreign Application Priority Data

Dec. 22, 1993 [JP] Japan ..................... 5-346665

[51] Int. Cl.$^6$ ........................................... C22C 21/02
[52] U.S. Cl. ........................................... 420/530; 148/439
[58] Field of Search ............................. 420/530; 148/439

[56] References Cited

U.S. PATENT DOCUMENTS 4,147,074  4/1979  Noguchi et al. .................. 148/439
4,732,820  3/1988  Mori ................................ 420/530

FOREIGN PATENT DOCUMENTS 50-56304   5/1975  Japan.
59-104449  6/1984  Japan.
2-115339   4/1990  Japan.

*Primary Examiner*—Sikyin Ip
*Attorney, Agent, or Firm*—Browdy and Neimark

[57] ABSTRACT

An aluminum alloy for sliding materials consists, by weight, of Si of not less than 8% but less than 15%, 1 to 5% Cu, 0.1 to 2% Mg, 1 to 6% Sn, and optionally 0.5 to 3% Pb, and the balance Al and incidental impurities. This aluminum alloy for sliding materials exhibits high toughness without affecting a sliding property, an anti-seizure property, a castability and a machinability.

7 Claims, 1 Drawing Sheet

ALUMINUM ALLOY FOR SLIDING MATERIALS

BACKGROUND OF THE INVENTION

This invention relates to an aluminum alloy for sliding materials which is excellent in machinability, anti-seizure property and toughness.

ADC12 (Al-Si base alloy) is known as a sliding material for high-load applications, but since this alloy is not sufficiently satisfactory in sliding properties, various improved alloys have been developed.

However, with recent marked technological innovations, there has been a demand for a sliding material for use under application of a higher load. For example, a bearing alloy for a bearing has now been required to withstand a higher load. A solid material used as a mechanical part by itself, such as a revolving scroll of a scroll-type compressor and an Oldham's ring, has been required to have a mechanical strength as a solid body. Under the circumstances, there has been encountered a technical problem that the conventional aluminum alloys could not have sufficient mechanical properties to meet such requirements.

SUMMARY OF THE INVENTION

It is therefore an object of this invention to provide an aluminum alloy for sliding materials which has excellent toughness without affecting various properties required for the sliding material, such as an anti-seizure property and wear resistance, castability and machinability.

The above object has been achieved by an aluminum alloy for sliding materials which consists, by weight, of Si of not less than 8% but less than 15%, 1 to 5% Cu, 0.1 to 2% Mg, 1 to 6% Sn, and the balance Al and incidental impurities. The aluminum alloy may further contain 0.5 to 3% Pb. The aluminum alloy may further contain 0.2 to 1.0% V.

The aluminum alloy of the present invention can further contain at least one of 0.01 to 3% in total selected from the group consisting of Sr, Ti and B.

The reason for specifying the composition of the aluminum alloy of the invention in the following will now be described.

(1) Si: not less than 8% but less than 15%

Si improves wear resistance and creep resistance, and lowers the thermal expansion coefficient. If this content of Su is less than 8%, particularly the wear resistance is not satisfactory. If this content is more than 15%, a hyper-eutectic silicon which is coarse in size, and since these coarse hyper-eutectic silicon particles are brittle, the alloy becomes weak against an impact, and, in addition, satisfactory machinability can not be obtained.

(2) Cu: 1 to 5%

Cu is in a solid-solution state in a matrix to increase mechanical strength, such as hardness and tensile strength, and wear resistance. If this Cu content is less than 1%, the mechanical strength and the wear resistance can not be enhanced satisfactorily. If this content is more than 5%, the alloy becomes brittle, and besides the castability is adversely affected. Preferably, this Cu content is 2 to 4.5%.

(3) Mg: 0.1 to 2%

Mg is in a solid-solution state in a matrix, or precipitates as an intermetallic compound ($Mg_2Si$), to increase the tensile strength, the hardness and the wear resistance. If this content is less than 0.1%, these effects can not be expected. If this content is more than 2%, the castability is adversely affected.

(4) Sn: 1 to 6%

Sn provides a good lubrication property, and is uniformly distributed along aluminum grain boundaries to enhance conformability, and Sn also enhances the anti-seizure property and the machinability, and particularly prevents Si from being peeled off. If this content is less than 1%, the satisfactory effect of Sn can not be expected. If this Sn content is more than 6%, the mechanical strength of the alloy is lowered. When regarding the anti-seizure property as important, it is preferred that the Sn content is 3 to 6%.

(5) Pb: 0.5 to 3%

Pb has an excellent. self-lubricating property, and improves the anti-seizure property of the alloy, and provides a machinability enabling a good surface finish. If this content is less than 0.5%, the satisfactory effect of Pb can not be expected. If this content is more than 3%, segregation is liable to occur during the casting, and besides the mechanical strength is lowered. When regarding the anti-seizure property as important, it is preferred that the Pb content is 1 to 3%.

(6) V: 0.2 to 1.0%

V, when added in the range of 0.2 to 1.0%, improves the mechanical strength, and acts synergistically with the above noted elements (1) to (4) of the alloy to improve the wear resistance and the anti-seizure property.

(7) Sr, Ti, B

These above noted elements (1) to (4) make the Si particles (in the aluminum alloy) fine in grain size to enhance the toughness. These elements act synergistically with the elements above noted (1) to (4) of the alloy to enhance the required properties, and good results were obtained when the content of these elements in total was in the range of 0.01 to 3%.

The aluminum alloy of the present invention consists, by weight, of Si of not less than 8% but less than 15%, 1 to 5% Cu, 0.1 to 2% Mg, 1 to 6% Sn, and optionally 0.5 to 3% Pb, and the balance Al and incidental impurities. Therefore, the aluminum alloy for sliding materials is excellent in anti-seizure property, machinability, wear resistance, tensile strength and elongation, and has a high impact resistance.

Further, 0.2 to 1.0% V may be added to the aluminum alloy of the present invention, and the addition of 0.2 to 1.0% V enhances the wear resistance and anti-seizure property of the aluminum alloy.

When the aluminum alloy of the present invention further contains at least one of 0.01 to 3% in total selected from the group consisting of Sr, Ti and B, the toughness is further improved.

Therefore, the alloy of the present invention is suitable for a mechanical sliding material of a solid construction required to have a high mechanical strength, such as a revolving scroll of a scroll-type compressor or an Oldham's ring.

Moreover, since the alloy of the present invention has an excellent machinability, a smooth sliding surface can be obtained, thus providing excellent sliding properties.

DESCRIPTION OF THE PREFERRED EMBODIMENTS

Figure 1:
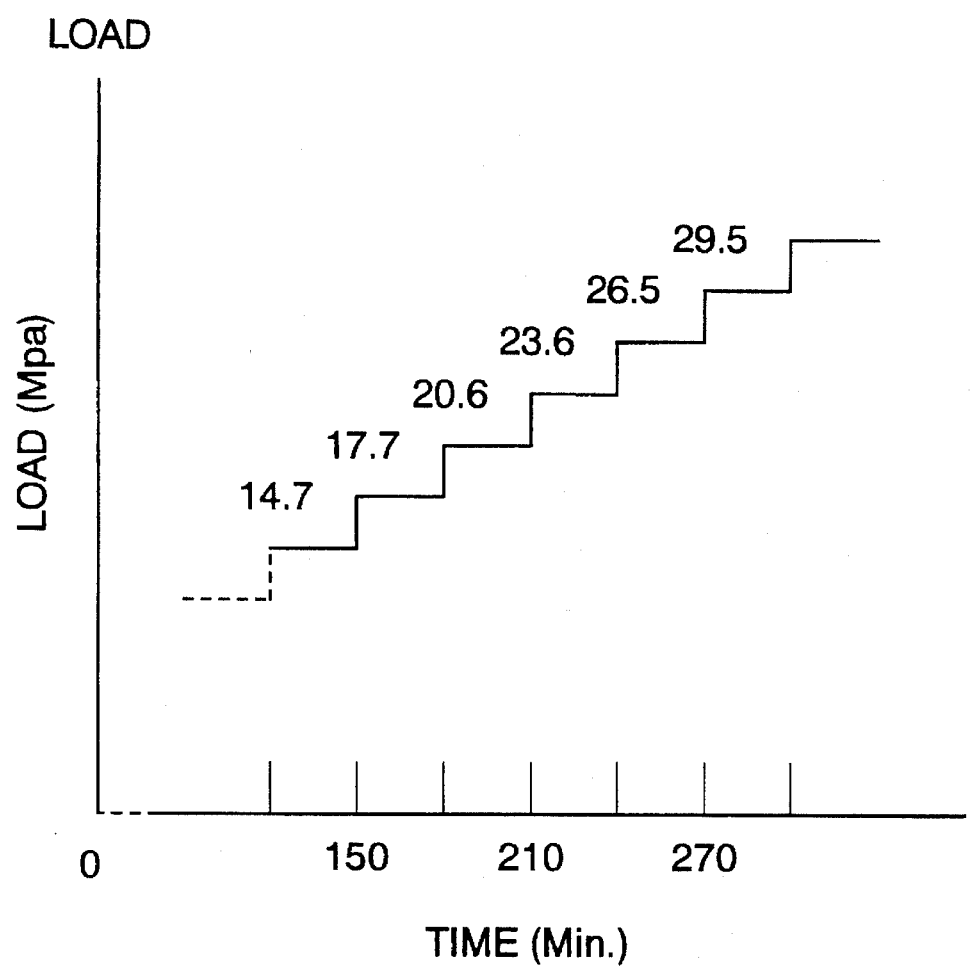
FIG. 1 shows load and time relationship in conjunction with Table 2.

Alloys, having respective compositions shown in Table 1, were cast into a billet of a rectangular parallelepipedic shape (30 mm×110 mm×80mm) by a mold casting method at a casting temperature of 650 to 780° C. These billets were subjected to a T6 treatment (Solution treatment: 520°C.; Artificial aging: 170°C. ×7 hours). Test pieces of JIS ADC12(Comparative Example), Comparative Examples 1 and 2, and Examples 3 to 12 were prepared from these billets by cutting. Roughness of these test pieces was Rmax 2.5 to 4 μm.

TABLE 1

| SAMPLE NO. | CHEMICAL COMPOSITION (wt. %) | | | | | | | | |
|---|---|---|---|---|---|---|---|---|---|
| | Al | Si | Cu | Mg | Sn | Pb | V | Sr | Ti | B |
| COMPARATIVE EXAMPLE | | | | | | | | | |
| ADC 12 | Bal. | 11 | 2.5 | | | | | | | |
| 1 | Bal. | 11 | 4.0 | | 0.8 | | | | | |

TABLE 1-continued

| SAMPLE NO. | CHEMICAL COMPOSITION (wt. %) | | | | | | | | |
|---|---|---|---|---|---|---|---|---|---|
| | Al | Si | Cu | Mg | Sn | Pb | V | Sr | Ti | B |
| 2 | Bal. | 11 | 2.0 | | 7.0 | | | | | |
| EXAMPLE | | | | | | | | | |
| 3 | Bal. | 8 | 5.0 | 1.0 | 3.0 | 0.5 | | | | |
| 4 | Bal. | 8 | 1.0 | 0.5 | 5.0 | | 1.0 | | 1.5 | 0.5 |
| 5 | Bal. | 9 | 4.0 | 1.8 | 6.0 | 3.0 | | | | |
| 6 | Bal. | 10 | 3.0 | 1.5 | 1.0 | 2.0 | | | | |
| 7 | Bal. | 11 | 3.0 | 2.0 | 3.0 | 1.0 | | 0.01 | | |
| 8 | Bal. | 11 | 5.0 | 0.1 | 1.0 | 2.0 | 0.2 | | 0.2 | 0.04 |
| 9 | Bal. | 11 | 2.0 | 2.0 | 4.0 | 1.0 | 0.2 | 0.05 | | |
| 10 | Bal. | 14 | 2.0 | 1.0 | 5.0 | 1.0 | | 0.05 | | |
| 11 | Bal. | 14 | 2.5 | 0.5 | 3.0 | 3.0 | 0.2 | | 1.0 | 0.02 |
| 12 | Bal. | 15 | 3.5 | 1.0 | 6.0 | | | | | |

Four samples of each of the test pieces were subjected to a seizure test under test conditions shown in Table 2 and FIG. 1, and results thereof are shown in Table 3 in which "X" indicates the occurrence of seizure at various bearing pressures.

TABLE 2

| Test conditions | Dimensions | Unit |
|---|---|---|
| Dimensions of test piece | Outer dia. 27.2 × Inner dia. 22 | mm |
| Number of revolutions | 1500 | rpm |
| Peripheral speed | 1.93 | m/s |
| Lubricating oil | SAE#30 | — |
| Lubricating method | Oil bath | — |
| Lubricating oil temperature | Room temperature | At the time of start |
| Material of shaft | S45C | — |
| Roughness of shaft | 0.3 | RMAX μm |
| Hardness of shaft | 500–600 | Hv |

TABLE 3

| SAMPLE NO. | KIND OF ALLOY | | | | | | | |
|---|---|---|---|---|---|---|---|---|
| | BEARING PRESSURE OF SEIZURE TEST (MPa) | | | | | | | |
| | 11.8 | 14.7 | 17.7 | 20.6 | 23.6 | 26.5 | 29.5 | No seizure |
| COMPARATIVE EXAMPLE | | | | | | | | |
| ADC 12 | | xx | x | x | | | | |
| 1 | | x | xx | x | | | | |
| 2 | | | | | | x | | o |
| EXAMPLE | | | | | | | | |
| 3 | | | | | | x | x | oo |
| 4 | | | | | | | x | ooo |
| 5 | | | | | | | | oooo |
| 6 | | | | | | x | x | oo |
| 7 | | | | | | | x | ooo |
| 8 | | | | | | x | x | oo |
| 9 | | | | | | | x | ooo |
| 10 | | | | | | | | oooo |
| 11 | | | | | | | | oooo |
| 12 | | | | | | | | oooo |

A test for the machinability was conducted by a method in which samples of a cylindrical shape, which were cut respectively from the billets, were subjected to machining under the same conditions. Results thereof are shown in Table 4 in which those samples having a good smooth surface are indicated by "o" while those samples having an unfavorable roughened surface such as gouged surface are indicated by "x".

TABLE 4

| SAMPLE NO. | KIND OF ALLOY | | | |
|---|---|---|---|---|
| | MACHINABILITY | WEAR TEST | TENSILE STRENGTH N/mm$^2$ | ELONGATION % |
| COMPARATIVE EXAMPLE | | | | |
| ADC 12 | x | x | 28 | 1.6 |
| 1 | x | Δ | 30 | 0.8 |
| 2 | o | x | 27 | 1.0 |
| 3 | o | o | 30 | 2.0 |

TABLE 4-continued

| | KIND OF ALLOY | | | |
|---|---|---|---|---|
| SAMPLE NO. | MACHIN- ABILITY | WEAR TEST | TENSILE STRENGTH N/mm² | ELONGA- TION % |
| 4 | o | o | 29 | 4.3 |
| 5 | o | o | 32 | 2.3 |
| 6 | o | o | 31 | 2.4 |
| 7 | o | o | 33 | 2.0 |
| 8 | o | o | 35 | 1.6 |
| 9 | o | o | 33 | 1.8 |
| 10 | o | o | 35 | 2.0 |
| 11 | o | o | 34 | 2.2 |
| 12 | o | o | 36 | 2.1 |

A wear test was conducted under test conditions shown in Table 5. Evaluation was made in terms of the depth of wear abrasion. Those samples having a wear depth of less than 1.5 μm are indicated by "o", those having a wear depth in the range of between 1.5 μm and less than 2.5 μm are indicated by "Δ", and those having a wear depth of more than 2.5 μm are indicated by "×". These results are also shown in Table 4.

TABLE 5

| Test Conditions | |
|---|---|
| Load | 20.7 MPa |
| Friction velocity | 1.0 m/s |
| Friction distance | 200 m |
| Lubricating oil | SAE#30 |
| Amount of lubricating oil | 20 ± 2 drops/min. |

As will be appreciated from the results of the seizure test, the machinability test and the wear resistance test shown in Tables 3 and 4, Comparative Example ADC12, not containing Sn, Pb and Mg, and Comparative Example 1, containing 0.8% Sn but not containing Mg and Pb, are inferior in machinability, anti-seizure property and wear resistance. Comparative Example 2, containing 7% Sn but not containing Mg and Pb, is inferior in wear resistance.

Examples 3 to 12 are excellent in machinability, anti-seizure property and wear resistance.

Next, in order to determine the mechanical strength, a tensile test and an elongation test were conducted. JIS5 tensile test pieces were prepared, and were used for the tensile test. Results thereof are also shown in Table 4.

As will be appreciated from the test results elongation and tensile strength, thus exhibiting higher toughness, as compared with the Comparative Examples.

What is claimed is:

1. An aluminum alloy for sliding materials which consists, by weight, of Si of not less than 8% but less than 15%, 1 to 5% Cu, 0.1 to 2% Mg, 1 to 6% Sn, 0.2 to 1% V, 0.01 to 3% in total of both Ti and B, and the balance of Al and incidental impurities.

2. An aluminum alloy for sliding materials which consists, by weight, of Si of not less than 8% but less than 15%, 1 to 5% Cu, 0.1 to 2% Mg, 1 to 6% Sn, 0.5 to 3% Pb, 0.2 to 1.0% V, 0.01 to 3% in total of both Ti and B, and the balance Al and incidental impurities.

3. An aluminum alloy according to claim 2, in which the Sn content is 3 to 6%, and the Pb content is 1 to 3%.

4. An aluminum alloy according to claim 1, wherein the content of Cu is 2 to 4.5% by weight.

5. An aluminum alloy according to claim 2, wherein the content of Cu is 2 to 4.5% by weight.

6. An aluminum alloy according to claim 3, wherein the content of Cu is 2 to 4.5% by weight.

7. An aluminum alloy for sliding materials which consists, by weight, of Si of not less than 8% but less than 15%, 1–5% Cu, 1–6% Sn, 0.1–2% Mg, and at least 0.02% B and at least 0.2% Ti so as to provide an amount of Ti and B of up to 3% in total, and the balance Al and incidental impurities.

* * * * *